United States Patent
Voigt et al.

(10) Patent No.: US 12,286,043 B2
(45) Date of Patent: Apr. 29, 2025

(54) SEAT COVER FASTENING

(71) Applicant: Velcro IP Holdings LLC, Manchester, NH (US)

(72) Inventors: Paul Joseph Voigt, Waterdown (CA); Victor Horst Kheil, Kitchener (CA)

(73) Assignee: Velcro IP Holdings LLC, Manchester, NH (US)

( * ) Notice: Subject to any disclaimer, the term of this patent is extended or adjusted under 35 U.S.C. 154(b) by 0 days.

(21) Appl. No.: 17/898,568

(22) Filed: Aug. 30, 2022

(65) Prior Publication Data

US 2023/0104258 A1 Apr. 6, 2023

Related U.S. Application Data

(60) Provisional application No. 63/252,723, filed on Oct. 6, 2021.

(51) Int. Cl.
*A47C 7/02* (2006.01)
*B60N 2/58* (2006.01)
*C09J 5/02* (2006.01)

(52) U.S. Cl.
CPC .................................. *B60N 2/5875* (2013.01)

(58) Field of Classification Search
CPC ....... B60N 2/5875; B60N 2/58; B60N 2/5891
See application file for complete search history.

(56) References Cited

U.S. PATENT DOCUMENTS

| | | | |
|---|---|---|---|
| 4,693,921 A | 9/1987 | Billarant et al. | |
| 4,784,890 A | 11/1988 | Black | |

(Continued)

FOREIGN PATENT DOCUMENTS

| | | |
|---|---|---|
| CN | 1204235 | 1/1999 |
| CN | 1225058 | 8/1999 |

(Continued)

OTHER PUBLICATIONS

Hanescompanies.com [online], "Hanes Companies," available on or before Jan. 6, 2006, via Internet Archive: Wayback Machine URL<https://web.archive.org/web/20060110230639/https://hanescompanies.com/>, retrieved on Oct. 22, 2021, URL<https://hanescompanies.com/>, 3 pages.

(Continued)

*Primary Examiner* — Shin H Kim
(74) *Attorney, Agent, or Firm* — Fish & Richardson P.C.

(57) ABSTRACT

A molded seat cushion is adapted for receiving a seat cover by providing an adhesive on either or both of a flexible fastener sheet and a selected area of a molded foam cushion surface, positioning the flexible fastener sheet to cover the selected area, and allowing the adhesive to set to permanently bond the flexible fastener sheet over the selected area of the molded foam cushion surface. The selected area features a three-dimensional contour that the flexible fastener sheet follows as bonded. A related flexible fastener product has a non-woven textile sheet and a resin layer secured to the textile sheet and carrying an array of discrete male touch fastener elements. The resin layer includes multiple parallel strips of resin, each resin strip carrying respective touch fastener elements, with each pair of adjacent strips separated by an exposed lane of the non-woven textile sheet.

22 Claims, 8 Drawing Sheets

(56) References Cited

U.S. PATENT DOCUMENTS

| | | | |
|---|---|---|---|
| 4,931,344 A | 6/1990 | Ogawa et al. | |
| 5,260,015 A | 11/1993 | Kennedy et al. | |
| 5,393,479 A * | 2/1995 | Nadeau | B29C 43/08 |
| | | | 264/324 |
| 5,518,795 A | 5/1996 | Kennedy et al. | |
| 5,606,781 A | 3/1997 | Provost et al. | |
| 5,702,159 A | 12/1997 | Matsuoka et al. | |
| 6,026,527 A * | 2/2000 | Pearce | B29C 48/08 |
| | | | 428/137 |
| 6,248,419 B1 | 6/2001 | Kennedy et al. | |
| 6,406,588 B1 * | 6/2002 | Sheetz | C09J 5/04 |
| | | | 428/317.1 |
| 6,877,808 B2 * | 4/2005 | Lichtinger | B60N 2/002 |
| | | | 297/217.3 |
| 7,048,818 B2 | 5/2006 | Krantz et al. | |
| 7,807,244 B2 | 10/2010 | Line | |
| 8,562,769 B2 * | 10/2013 | Kraus | E04D 5/144 |
| | | | 52/309.5 |
| 8,685,194 B2 * | 4/2014 | Grady | A44B 18/0088 |
| | | | 427/256 |
| 9,399,333 B2 * | 7/2016 | Medina | A44B 18/0049 |
| 9,958,070 B2 | 5/2018 | Comu et al. | |
| 10,405,614 B2 * | 9/2019 | Rocha | A44B 18/0003 |
| 10,421,414 B2 | 9/2019 | Townlet et al. | |
| 11,383,625 B2 * | 7/2022 | Voigt | B60N 2/5891 |
| 11,731,542 B2 * | 8/2023 | Voigt | B60N 2/5833 |
| | | | 428/429 |
| 2001/0013146 A1 * | 8/2001 | Wempe | A61G 5/1043 |
| | | | 5/654 |
| 2001/0016245 A1 * | 8/2001 | Tuman | B29C 43/222 |
| | | | 428/120 |
| 2003/0121103 A1 * | 7/2003 | Wempe | A61G 5/1045 |
| | | | 5/654 |
| 2003/0189362 A1 * | 10/2003 | Lichtinger | B60N 2/002 |
| | | | 297/217.3 |
| 2006/0273650 A1 * | 12/2006 | Embach | B60N 2/70 |
| | | | 297/452.27 |
| 2008/0038505 A1 * | 2/2008 | Salzmann | A47C 5/00 |
| | | | 428/71 |
| 2008/0258523 A1 * | 10/2008 | Santin | B60N 2/5825 |
| | | | 29/428 |
| 2009/0033130 A1 * | 2/2009 | Marquette | A47C 7/74 |
| | | | 297/180.15 |
| 2011/0167598 A1 | 7/2011 | Cheng | |
| 2012/0011685 A1 | 1/2012 | Rocha | |
| 2012/0027987 A1 * | 2/2012 | Poulakis | H05K 9/0067 |
| | | | 428/100 |
| 2016/0207432 A1 | 7/2016 | Teoh et al. | |
| 2017/0240081 A1 | 8/2017 | Cheng | |
| 2017/0295890 A1 | 10/2017 | Imai et al. | |
| 2021/0221266 A1 * | 7/2021 | Kozlowski | B32B 37/182 |
| 2021/0339664 A1 | 11/2021 | Voigt et al. | |
| 2022/0297580 A1 * | 9/2022 | Voigt | B29C 44/143 |
| 2023/0104258 A1 | 4/2023 | Voigt et al. | |

FOREIGN PATENT DOCUMENTS

| | | |
|---|---|---|
| CN | 1305759 | 8/2001 |
| CN | 1525825 | 9/2004 |
| CN | 1799807 | 7/2006 |
| CN | 107920634 | 4/2018 |
| EP | 0912364 | 10/2001 |
| EP | 2172122 | 4/2010 |
| JP | H05211909 | 8/1993 |
| WO | WO 1991/010383 | 7/1991 |
| WO | WO 1998/002331 | 1/1998 |
| WO | WO 2015/189394 | 12/2015 |

OTHER PUBLICATIONS

International Search Report and Written Opinion in International Application. No. PCT/US2021/029576, dated Aug. 3, 2021, 14 pages.

International Search Report and Written Opinion in International Appln. No. PCT/US2022/075741, dated Dec. 5, 2022, 15 pages.

Office Action in Chinese Appln. No. 202180031426.1, dated Mar. 24, 2023, 20 pages (with English translation).

International Preliminary Report on Patentability in International Appln. No. PCT/US2022/075741, mailed on Jan. 2, 2024, 16 pages.

Office Action in Chinese Appln. No. 202280063724.3, mailed on Sep. 27, 2024, 17 pages (with English machine translation).

* cited by examiner

SEAT COVER FASTENING

CROSS REFERENCE TO RELATED APPLICATIONS

This application claim priority to U.S. Provisional Application No. 63/252,723, filed Oct. 6, 2021, which is hereby incorporated by reference in its entirety for all purposes.

TECHNICAL FIELD

This invention relates to adapting molded seat cushions for receiving seat covers, and to flexible fastener products configured for such use.

BACKGROUND

Vehicle seats are commonly formed by molding a foam cushion to have a desired seat surface contour, and then covering the molded foam cushion with an upholstery or seat cover. The seat cover may be secured to the foam cushion with various fasteners, such as touch fasteners. For touch fastening, a male (hook) touch fastener may be attached to the foam cushion and adapted to engage with fibers or loops on an underside of the seat cover. The male touch fastener may be a fastening strip placed in the mold in which the seat cushion is molded. Such fastening strips are commonly called 'mold-in fasteners' and become part of the surface of the molded seat cushion. One of the challenges with mold-in fasteners is that their male touch fastener elements must remain unfouled during the foam molding process so that they are exposed to engage the seat cover. To keep the expanding foam from flowing between and fouling the fastener elements, various types of seals have been employed as well as means for holding the fastening strips in place during molding. Some such strips have been provided with flex points to allow the strips to follow a curved trench in the seat. Most such strips are relatively narrow so as to fit on a strip-form pedestal in the mold that forms a corresponding trench in the seat cushion.

SUMMARY

The present invention addresses some of the limitations of mold-in fasteners by adhesively bonding a flexible male fastener sheet over a three-dimensional contour of the seat cushion surface after molding. By three-dimensional contour, we mean a contour that curves in each of at least two orthogonal directions at each of one or more points on the contour.

One aspect of the invention features a method of adapting a molded seat cushion for receiving a seat cover. The method includes providing an adhesive on either or both of a flexible fastener sheet and a selected area of a molded foam cushion surface, positioning the flexible fastener sheet to cover the selected area, and allowing the adhesive to set to permanently bond the flexible fastener sheet over the selected area of the molded foam cushion surface. The selected area features a three-dimensional contour that the flexible fastener sheet follows as bonded.

In some examples, the flexible fastener sheet has a resin layer and an array of discrete male touch fastener elements, each fastener element having a stem integrally formed with and extending from an outer surface of the resin layer.

In some embodiments, the flexible fastener sheet also has a textile sheet, such as of a non-woven textile material, secured to an obverse side of the resin layer. Such a non-woven textile material preferably has an overall basis weight of between 50 and 100 grams per square meter.

In some cases, the resin layer includes multiple parallel strips of resin, each resin strip carrying respective touch fastener elements, with each pair of adjacent strips separated by a lane of exposed textile sheet. The textile sheet may be elastic in a direction transverse to the strips of resin.

In some instances, each strip of exposed textile sheet is of a width, in a direction transverse to the strips, less than 8 percent of an extent of the flexible fastener sheet in a direction transverse to the strips. Preferably, a ratio of a width of at least one of the multiple parallel strips of resin to a width of an adjacent lane of exposed textile sheet is between 1:1 and 6:1.

In some examples, the resin layer features multiple discrete islands of resin, each resin island carrying respective touch fastener elements, with adjacent islands separated by exposed textile sheet.

In some applications, the flexible fastener sheet also has a layer of foam permanently attached to a side of the resin layer opposite the touch fastener elements, with the adhesive provided on either or both of the layer of foam and the selected area of the molded foam cushion surface.

In some embodiments, the resin layer has one or more stiffening ribs of resin in addition to the touch fastener elements. The ribs are positioned to locally increase a bending stiffness of the flexible fastener sheet.

The touch fastener elements preferably extend to an overall height of between 0.13 and 1.6 mm from the resin layer, and the ratio of minimum to maximum lateral orthogonal dimensions of the flexible fastener sheet is preferably between 0.3 and 1.0.

Providing the adhesive may involve applying the adhesive directly to the flexible fastener sheet, such as by spraying the adhesive onto the flexible fastener sheet.

Providing the adhesive may involve exposing a pressure-sensitive adhesive on an obverse side of the flexible fastener sheet.

In some embodiments, positioning the flexible fastener sheet involves placing a positioning tool against the molded foam cushion surface with the selected area exposed to receive the flexible fastener sheet. The positioning tool may define an aperture corresponding to the selected area, and providing the adhesive may involve spraying the adhesive onto the selected area with the positioning tool in place.

In some cases, the selected area is an area of an outer surface of a bolster of the seat cushion. In some cases, the selected area includes portions of both a bolster and a central seating area of the seat cushion, or portions of each of two bolsters separating a central seating area between the bolsters.

In some examples, the three-dimensional contour is of a convex outer surface of the seat cushion.

In some cases, the three-dimensional contour is defined by radii of curvature that vary across the selected area.

Another aspect of the invention features a method of covering a foam seat cushion. The method includes adapting a molded seat cushion for receiving a seat cover, according to the inventive aspect described above, and then positioning a seat cover over the adapted molded seat cushion, such that fibers on an underside of the seat cover are engaged by the male touch fastener elements of the flexible fastener sheet.

Yet another aspect of the invention features a flexible fastener product having a non-woven textile sheet with an overall basis weight of between 50 and 100 grams per square meter, and a resin layer secured to the textile sheet and carrying an array of discrete male touch fastener elements.

Each fastener element has a stem integrally formed with and extending from an outer surface of the resin layer. The resin layer includes multiple parallel strips of resin, each resin strip carrying respective touch fastener elements, with each pair of adjacent strips separated by an exposed lane of the non-woven textile sheet. A ratio of a width of at least one of the multiple parallel strips of resin to a width of an adjacent lane of exposed textile sheet is between 1:1 and 6:1.

In some embodiments, the flexible fastener product also has adhesive disposed on a side of the textile sheet opposite the resin layer.

In some cases, the non-woven textile sheet is elastic in a direction transverse to the strips of resin.

Each lane of exposed textile sheet is preferably of a width, in a direction transverse to the strips, less than 8 percent of an extent of the flexible fastener product in a direction transverse to the strips. A ratio of a width of at least one of the multiple parallel strips of resin to a width of an adjacent lane of exposed textile sheet is preferably between 1:1 and 6:1. The touch fastener elements preferably extend to an overall height of between 0.13 and 1.6 mm from the resin layer. A ratio of minimum to maximum lateral orthogonal dimensions of the flexible fastener product is preferably between 0.3 and 1.0.

The non-woven textile material preferably has an overall basis weight of between 50 and 100 grams per square meter.

In some embodiments, the flexible fastener product also has a layer of foam permanently attached to a side of the resin layer opposite the touch fastener elements and securing the resin layer to the textile sheet.

In some examples, the resin layer has one or more stiffening ribs of resin in addition to the touch fastener elements. The ribs are positioned to locally increase a bending stiffness of the flexible fastener product.

By bonding the fastener sheet or product only after the seat cushion surface is molded, there is no concern about foam fouling the male fastener elements, or the fastener product being dislodged during foaming. It also eliminates distortions caused by foam shrinkage during curing. By providing the fastening function over a wide, contoured area, the fastening load is distributed across many discrete fastening points in any direction across the fastener sheet, reducing the load that must be carried by any one touch fastener element and enabling the use of smaller fastener elements and more flexible fastener structures. This allows the seat designer to focus on molding the desired final contour of the seat cushion, with less concern about discrete fastener placement.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
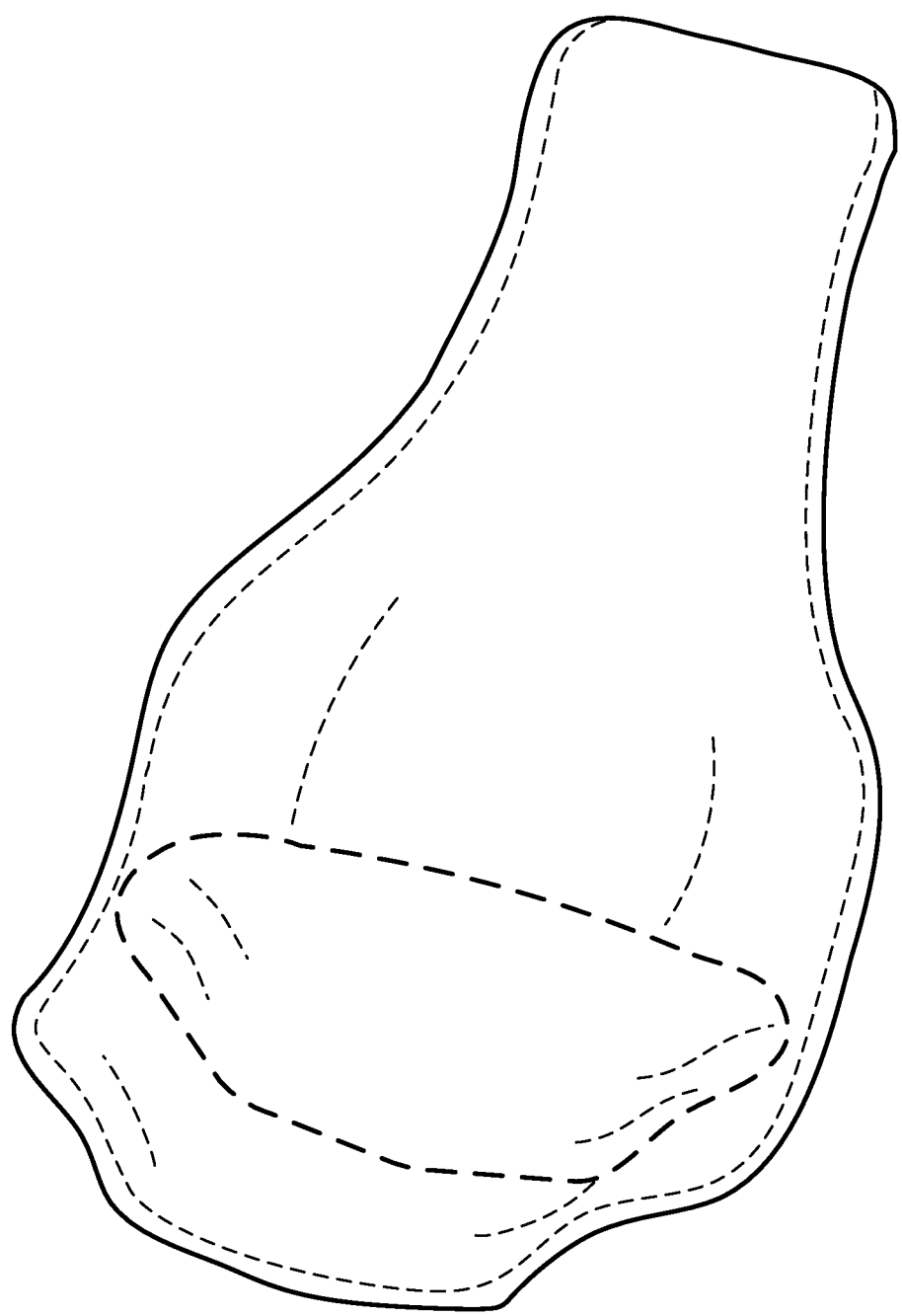
FIG. 1 is a perspective view of a vehicle seat.

Referring first to FIG. 1, a seat for a vehicle such as a passenger car has a fabric seat cover 10 stretched over and secured to a molded foam cushion. The cushion is designed to provide a beneficial and aesthetically pleasing contour, particularly on the top or seating surface. The seat cushion forms a blended contour of both the generally horizontal seating area 12 and the more vertical back 14 of the seating surface. The seat cover is attached to the foam cushion to follow its contour by various hook fasteners attached to the foam cushion and releasably engaging fibers on the inside surface of the cover.

In this example, one of the hook fasteners is a wide area fastener that covers an area 16 shown in dashed outline. The area 16 includes three-dimensional contours of both the seating area 12 and the back 14 of the seat cushion, and covers portions of both side bolsters 18a and 18b and a depressed region 20 between the bolsters. In some other examples, the area only includes a portion of a bolster, or a portion of the back of the seat cushion, or a portion of the depressed region between the bolsters. In each of these examples, the area includes a three-dimensional seat contour.

Figure 2:
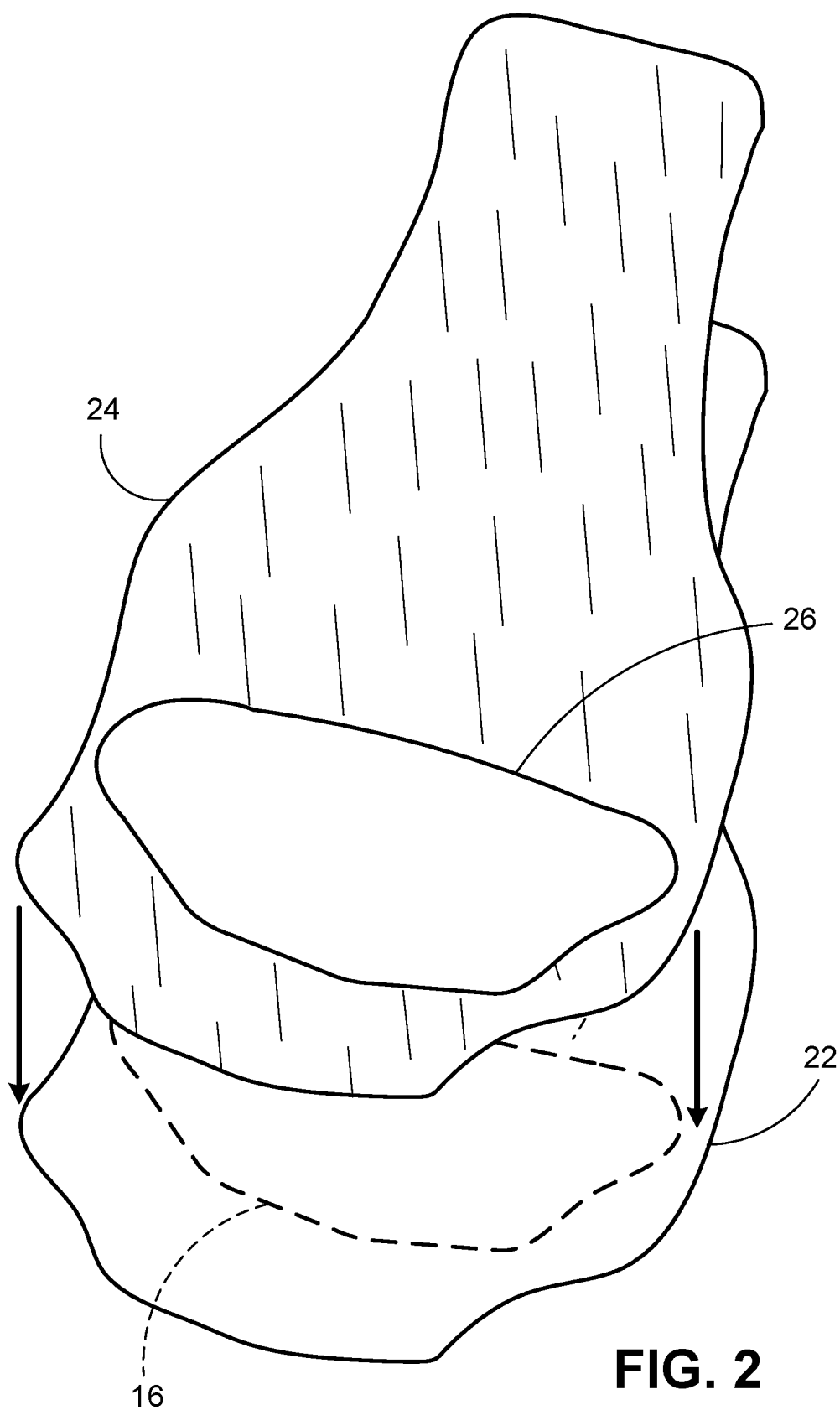
FIGS. 2-4 sequentially illustrate a method of securing a wide-area flexible fastener sheet to a selected area of a molded seat cushion.

Referring next to FIG. 2, the wide area fastener is permanently secured to a molded seat cushion 22 by a process that involves adhesively bonding the wide area fastener to the already molded surface of the seat cushion. In some cases this process begins by positioning a tool such as a template 24 on the cushion, with an aperture 26 defined through the template positioned to expose the area 16 but otherwise covering the surrounding seat cushion surface.

Figure 3:
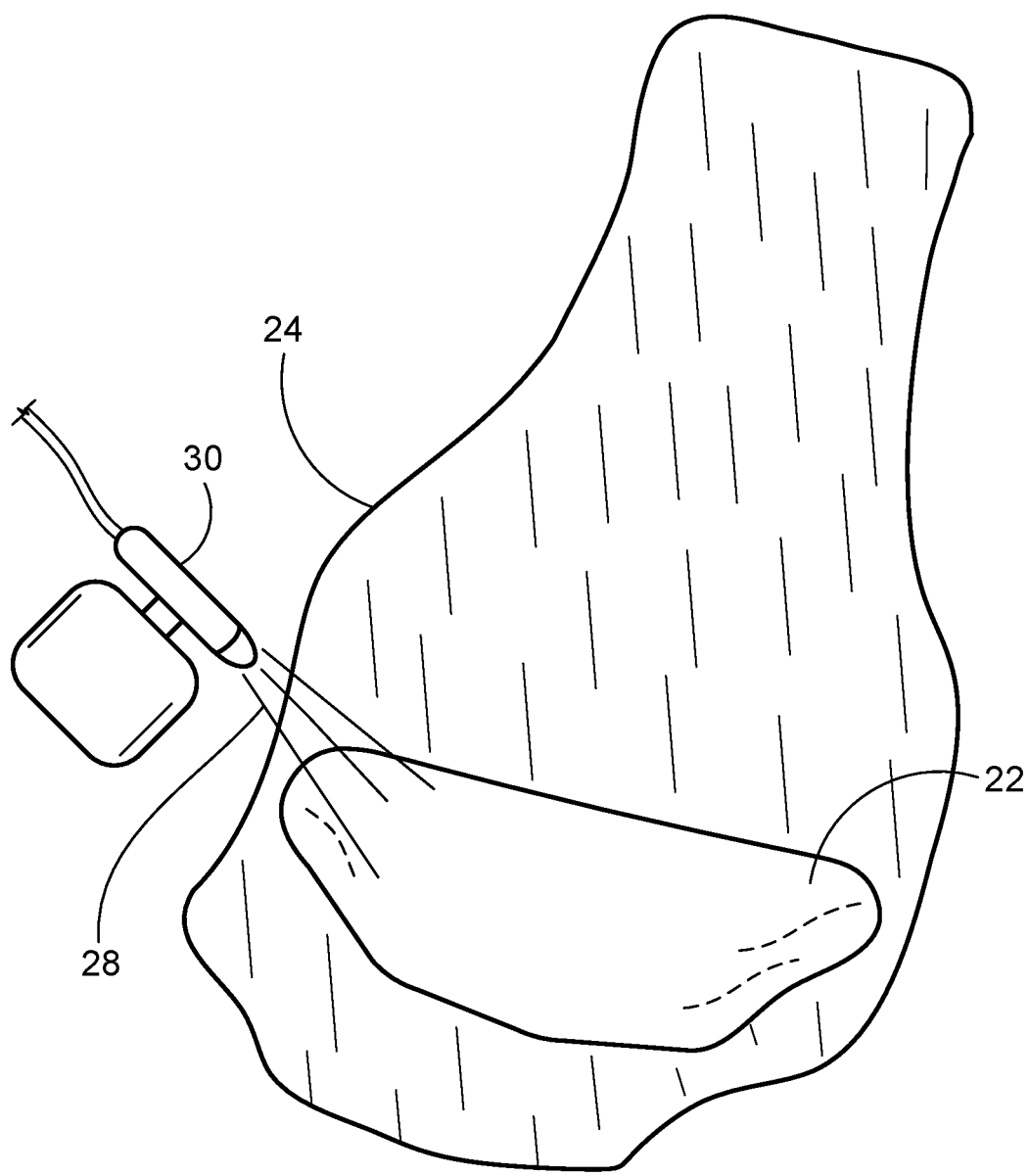
Figure 4:
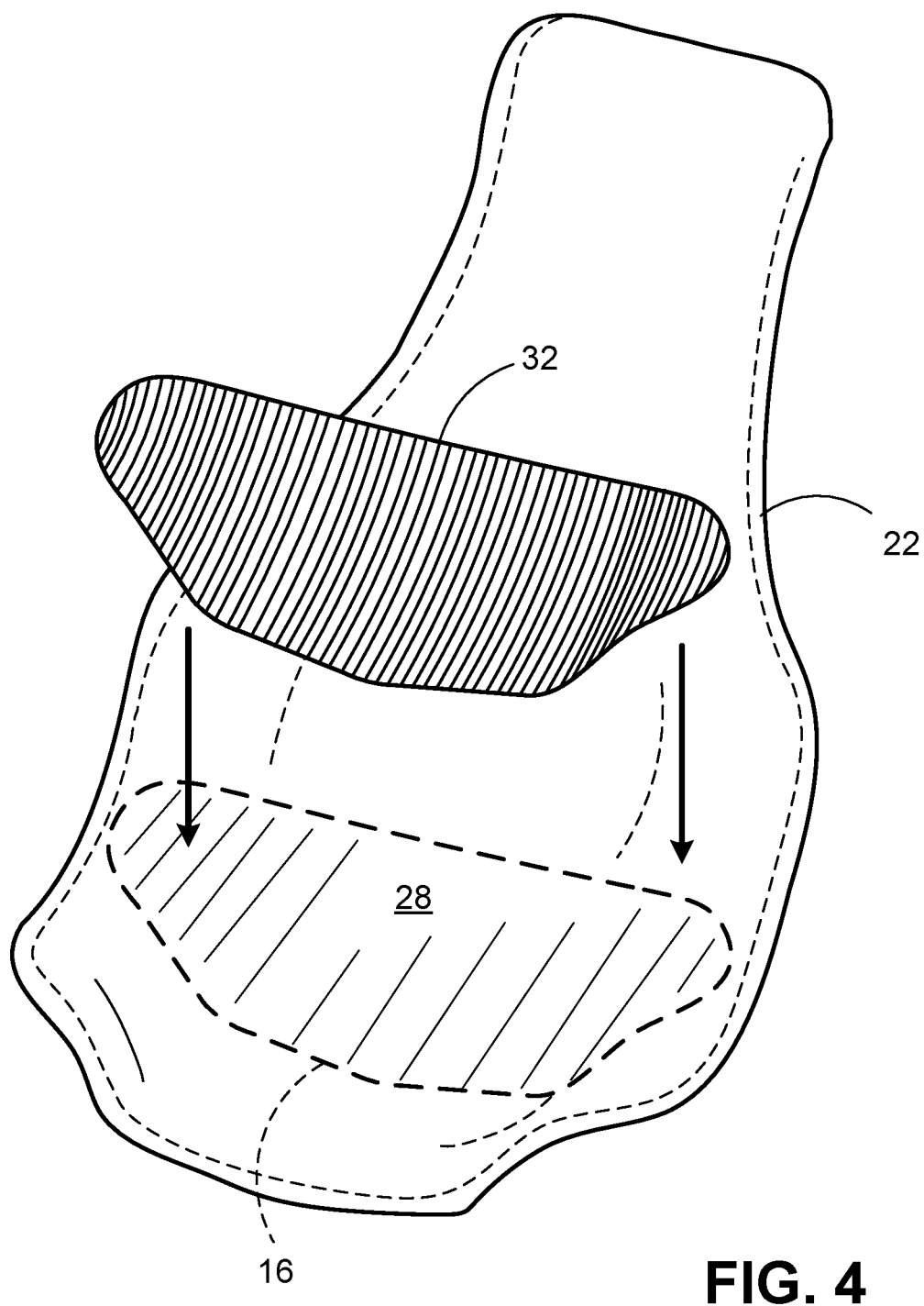

Referring next to FIG. 3, an adhesive 28 is applied to the seat cushion surface exposed through the template 24, such as by spraying the adhesive from a pressurized spray gun 30 or similar device. A suitable spray adhesive is Simalfa 321 spray foam, manufactured by Simalfa, Hawthorne, NJ, USA. After the adhesive is applied, the template is removed and a wide area hook fastener in the form of a flexible fastener sheet 32 is placed onto the adhesive, as shown in FIG. 4. The adhesive is allowed to set to permanently bond the flexible fastener sheet over the area 16 of the molded foam cushion surface.

Figure 5:
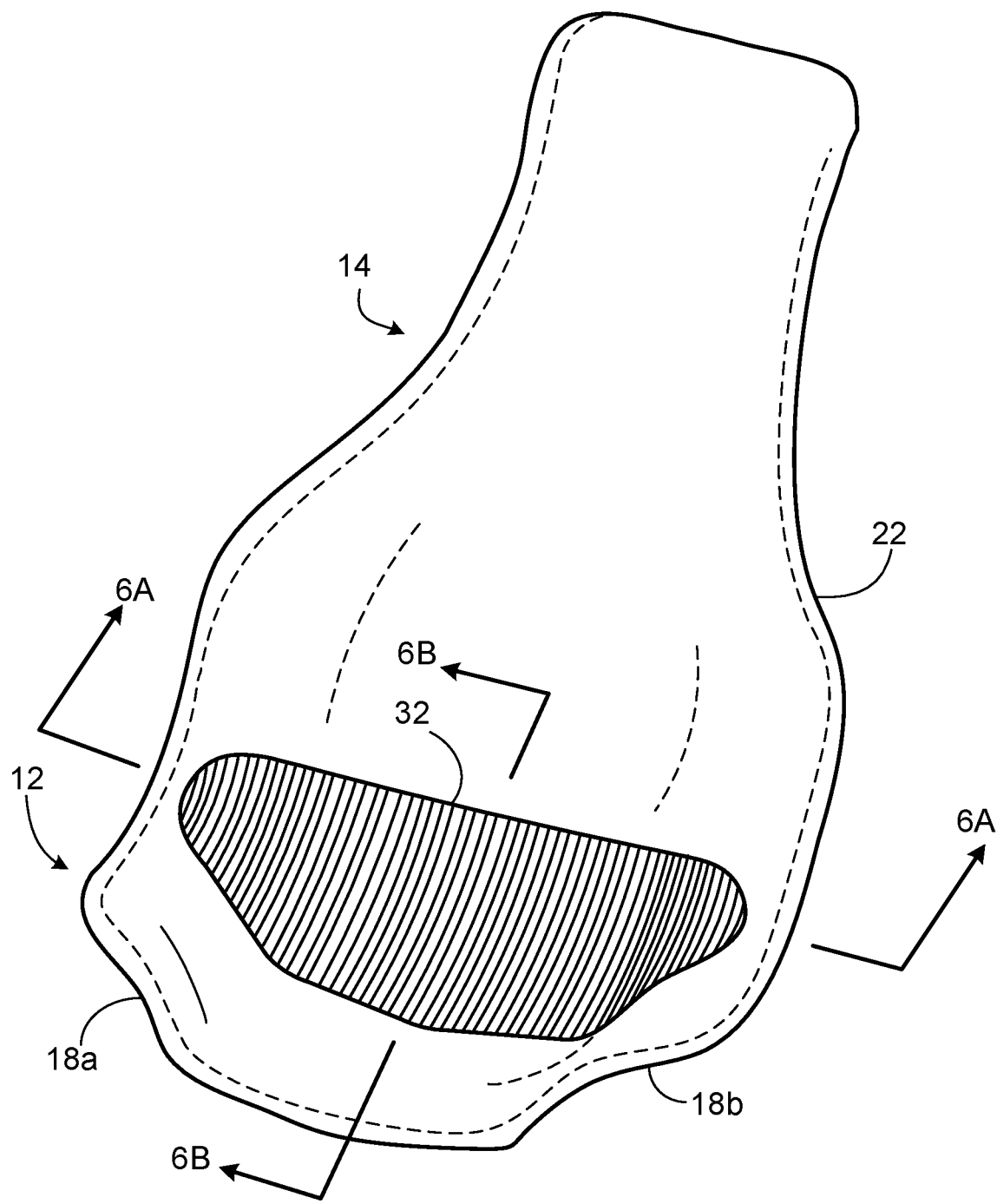
FIG. 5 is a perspective view of a molded seat cushion with an attached wide-area flexible fastener sheet.

The result is the adapted molded seat cushion 22 shown in FIG. 5. The flexible fastener sheet 32 precisely follows the surface contour of the seat foam cushion across the entire extent of the area it covers, including the covered portions of the bolsters 18a and 18b, the depressed region 20 between the bolsters, and a portion of the back 14 of the seat cushion.

Figure 6A:
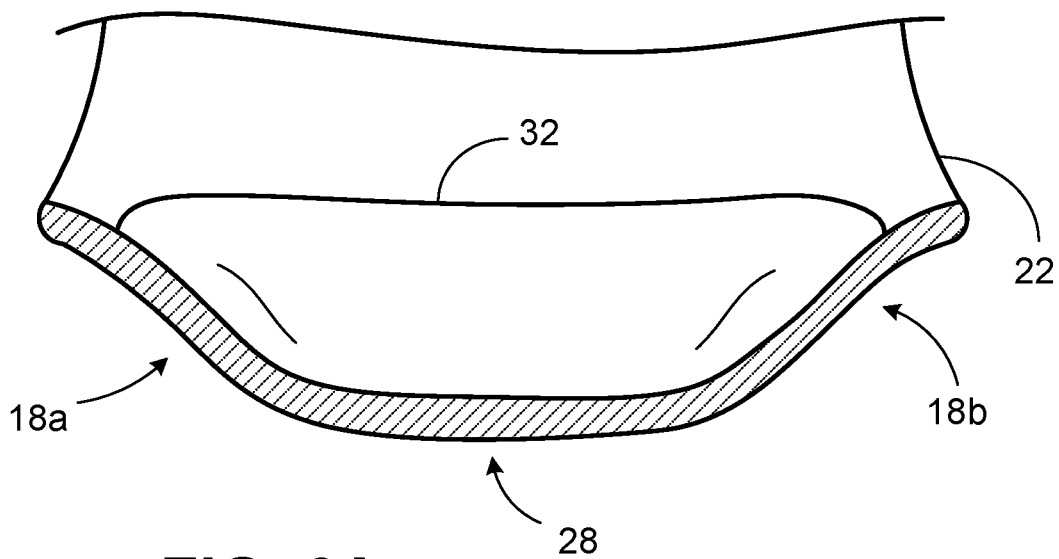
FIGS. 6A and 6B are cross-sectional views, taken along lines 6A-6A and 6B-6B, respectively, in FIG. 5.
Figure 6B:
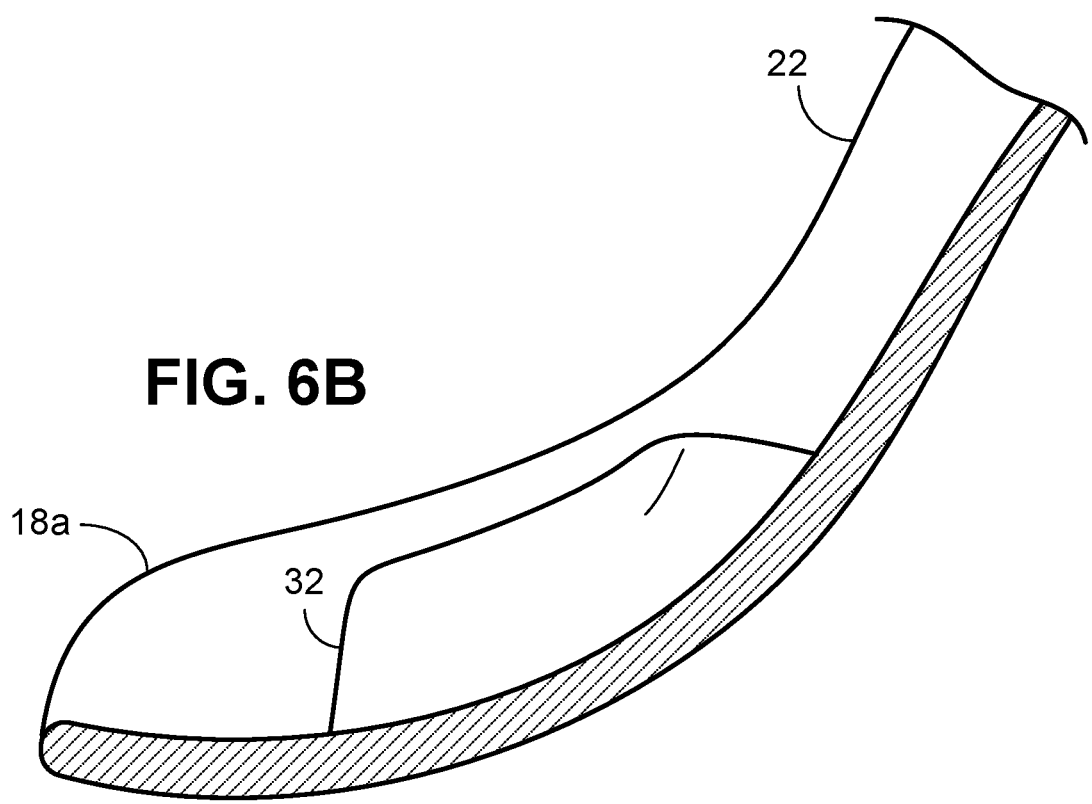

The three-dimensional contour over which the flexible fastener sheet 32 is bonded, and which it follows, is shown, for example, in FIGS. 6A and 6B. The thickness of the molded foam cushion in these figures is not to scale. FIG. 6A shows a contour of the seat cushion surface in a vertical plane across the seat, in which the surface is generally planar across much of the depressed region 20, is convex across the bolsters 18*a* and 18*b*, and has concave transitions between the depressed region and each bolster. FIG. 6B shows the contour of the seat cushion surface in a fore-aft vertical plane, in which the surface has a concave contour that extends across the seating area and up the back of the seat cushion. As will be apparent to those experienced in seat cushion design, the most complex and dramatic contours are often where the inner edge of the bolster meats the seat cushion back. These intersections can involve sharp contour transitions in each of three orthogonal planes. By design, some seat cushions have, in addition to the overall three-dimensional contour followed by the flexible fastener sheet 32, linear creases into which the seat cover is to be pressed, to give the appearance of a visual demarcation between portions of the seating surface. Some seating surfaces have regular contour features such as rolls and pleats. The contour shown in these figures is but one example of the type of contour that may be followed by the flexible fastener sheet.

Figure 7:
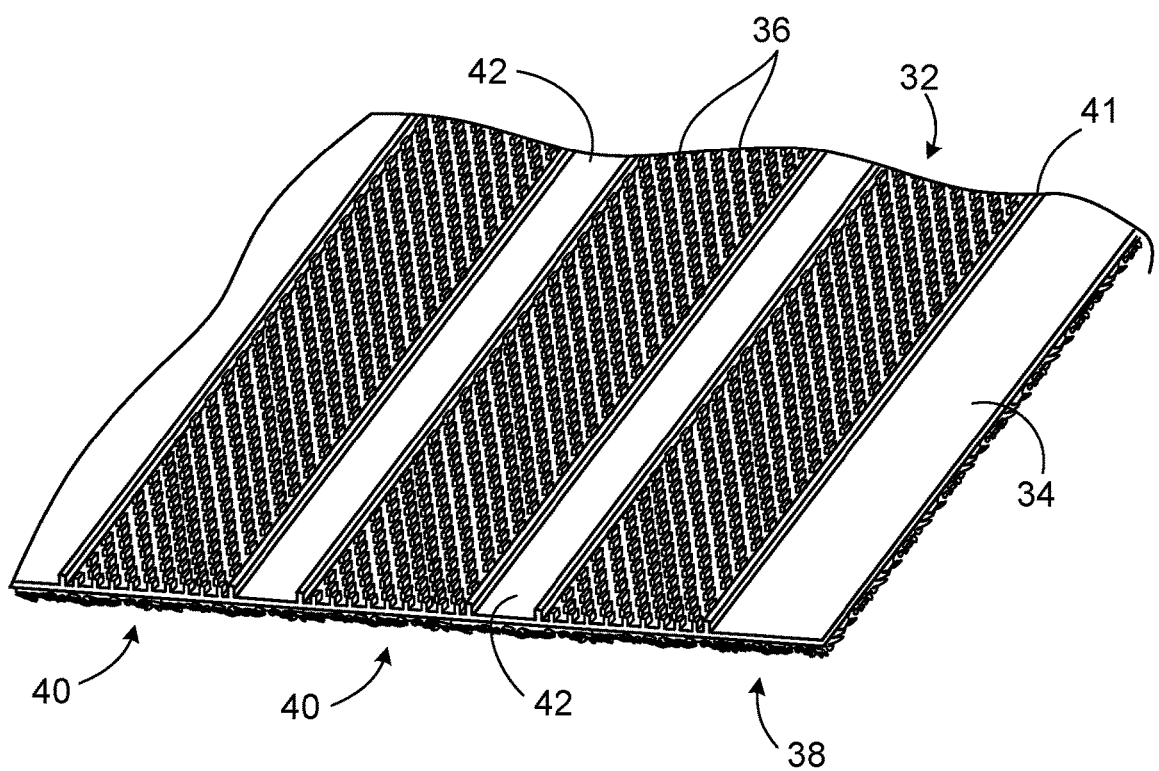
FIG. 7 is a perspective view of a first flexible fastener sheet.

Referring next to FIG. 7, the flexible fastener sheet 32 has a resin layer 34 and an array of discrete male touch fastener elements 36, such as hooks. A textile sheet 38 is secured to an obverse side of the resin layer 34, opposite the hooks. The textile sheet can be permanently secured to the resin layer by in-situ lamination as the hooks are molded, such as was taught by Kennedy et al. in U.S. Pat. No. 5,260,015, the contents of which are incorporated by reference. Alternatively, the textile sheet can be laminated to a formed hook fastener sheet. The textile sheet 38 may be in the form of a non-woven textile material, preferably a material with an overall basis weight of between 50 and 100 grams per square meter. Useful examples of textile sheet 36 include layered polypropylene non-wovens of SMS (spunbond-meltblown-spunbond) construction, such as a 55 gsm material sold by PFN of Hazleton, PA, USA, or a 58 gsm material manufactured by Berry Global, Evansville, IN, USA. Preferably the meltblown middle layer is impenetrable to prevent adhesive bleedthrough.

Figure 8:
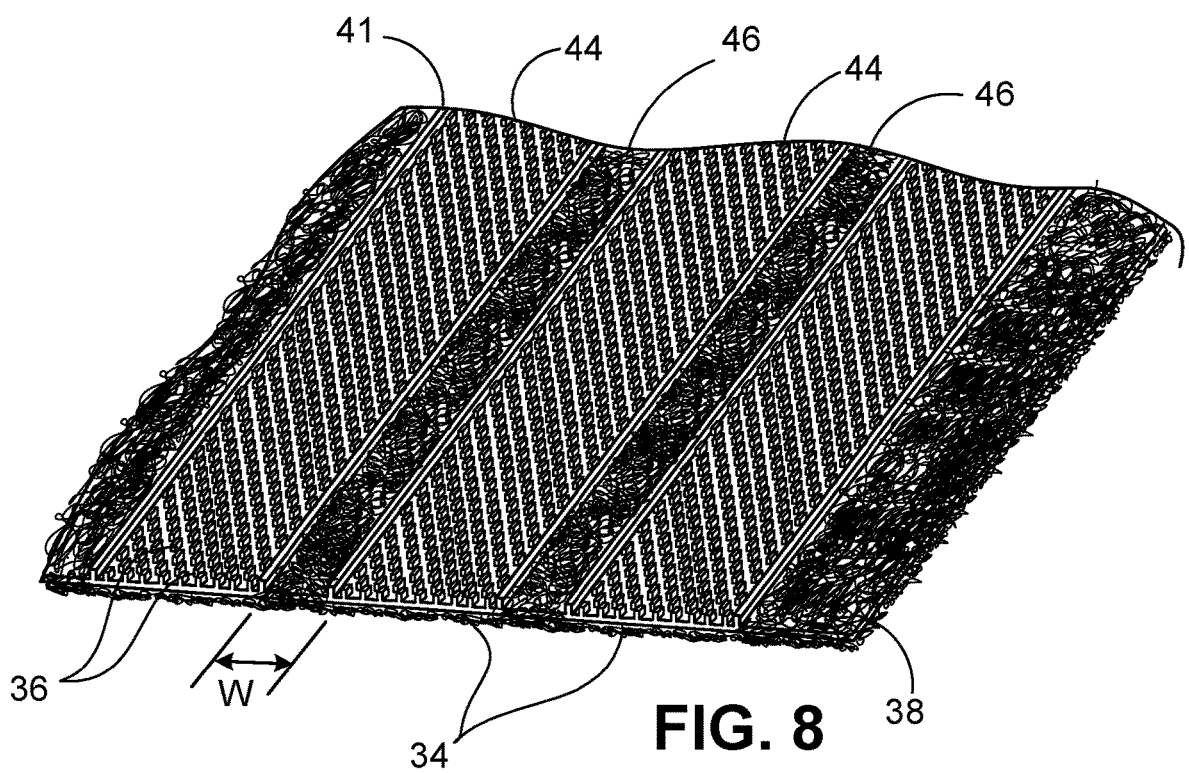
FIG. 8 is a perspective view of a second flexible fastener sheet.

The male touch fastener elements 36 are arranged in parallel lanes 40, each lane having multiple columns and multiple rows of male touch fastener elements. Preferably the hooks of adjacent columns are staggered along the length of the lane, meaning that the hooks of a given lane are aligned between the nearest hooks of its adjacent lanes in the direction of the lanes. In this example, each lane is bounded along its longitudinal edges by longitudinally continuous ribs 41 of molded resin. Ribs 41 may serve as stiffening ribs positioned to locally increase a bending stiffness of the flexible fastener sheet. The fastener sheet can be configured with ribs of different heights and only in locations where increased stiffness is desired. The resin layer 34 shown in FIG. 7 is continuous across the fastener sheet in a direction transverse to the lanes 40, forming a flat resin surface 42 between the lanes. In the example shown in FIG. 8, the resin layer consists of multiple parallel strips 44 of resin, each resin strip carrying a respective lane of touch fastener elements 36 arranged in rows and columns, with each pair of adjacent strips separated by a lane 46 of exposed textile sheet. Each lane 46 of exposed textile sheet is of a width W, in a direction transverse to the strips, less than 8 percent of an overall extent of the flexible fastener sheet in a direction transverse to the lanes. In some cases the textile sheet 38, and thus the lanes 46 of exposed textile sheet, is elastic in a direction transverse to the strips 44 of resin. Each resin layer strip 44 has a width, in a direction perpendicular to the strips, of about 3 to 8 millimeters, with a spacing between adjacent strips of 2 to 7 millimeters. Preferably, the ratio of the width of each strip to the width W of an adjacent exposed lane 46, is between 1:1 and 6:1. One useful arrangement is resin layer strips of 8 mm width separated by 2 mm spacing, or a width ratio of 4:1.

Figure 9:
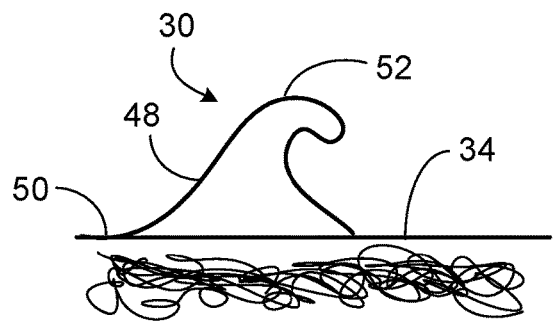
FIG. 9 is an enlarged side view of a portion of a flexible fastener sheet, showing a single fastener element.

Referring next to FIG. 9, each fastener element 36 has a stem 48 integrally formed with and extending from an outer surface 50 of the resin layer 34, and a head 52 that forms an overhanging crook for receiving and retaining loop fibers. The fastener element may be in the form of a J-hook as illustrated, or palm-tree type fastener elements with multiple crooks per fastener element, or mushroom-type fastener elements with heads that overhang stems on all sides. The heads 52 may be molded with the stems 48 or may be formed after the stems are molded. The touch fastener elements 36 preferably extend to an overall height of between 0.13 and 1.6 mm from the resin layer 34.

Figure 10:
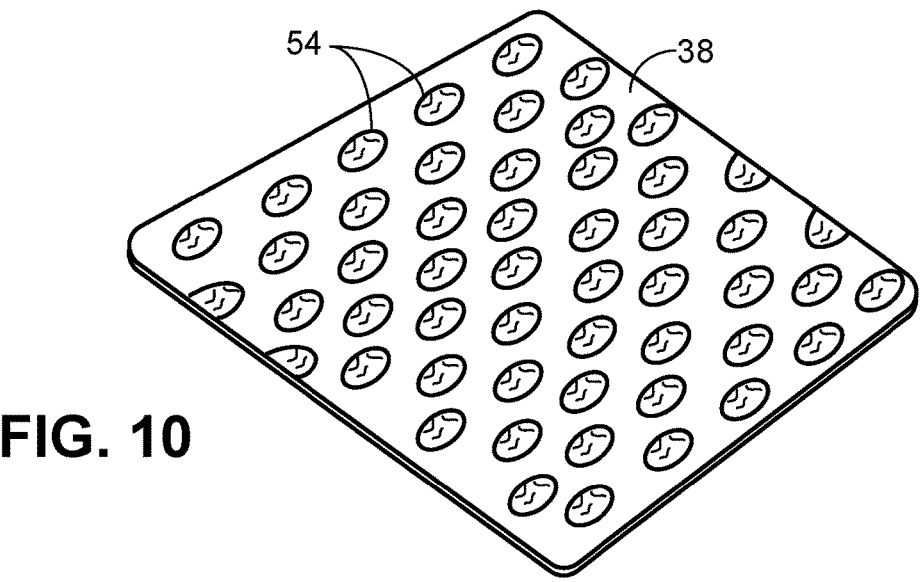
FIG. 10 is a perspective view of a third flexible fastener sheet.

Referring next to FIG. 10, in another example the resin layer is in the form of multiple discrete islands 54 of resin, each resin island carrying respective touch fastener elements, with adjacent islands separated by exposed textile sheet 38.

Figure 11:
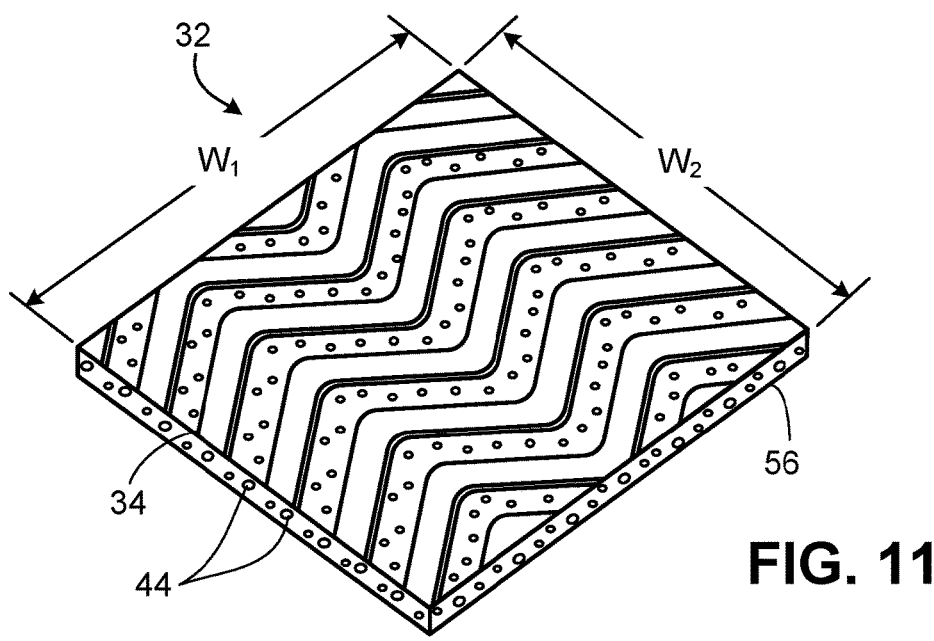
FIG. 11 is a perspective view of a fourth flexible fastener sheet.

Another example of flexible fastener sheet 32 is shown in FIG. 11. In this example, the resin layer 34 is in the form of parallel strips 44 of resin that each follow a zig-zag, rather than a straight, course across the fastener sheet. As in the above examples, each strip carries an array of fastener elements. In this example, the resin layer is bonded to a foam layer 56 that is exposed in zig-zag lanes between the resin layer strips. The foam layer is preferably very thin (e.g., 5 mm) and provides a tie layer for bonding the flexible fastener sheet to the foam seat cushion. If necessary to prevent adhesive bleed-through, a resin film may be provided between the foam layer 56 and the resin layer 34, such that the film is exposed between the resin layer strips. In some cases, the seat cushion can be molded to define a shallow recess across the area where the flexible fastener sheet is to be bonded, of a depth corresponding to the thickness of foam layer 56, such that after the flexible fastener sheet is bonded to the foam cushion the fastening surface of the flexible fastener sheet is coplanar with the surrounding surface of the molded foam cushion. In other examples (not illustrated), a foam layer such as foam layer 56 is permanently bonded to the obverse side of a fabric layer (such as fabric layer 38 of FIG. 8) carrying the resin layer, to provide both the benefits of a foam obverse layer for adhesive bonding and exposed fabric between the resin layer strips. The foam layer may be bonded to a non-woven fabric layer by flame lamination, for example.

The flexible fastener sheet 32 of the above examples is preferably sized to cover a wide area, as opposed to strip-form fasteners used along trenches of seat cushions. To that end, the flexible fastener sheet is preferably sized such that a ratio of minimum to maximum lateral orthogonal dimensions of the flexible fastener sheet (in the example of FIG. 11, W1/W2) is between 0.3 and 1.0.

While the above discussion relating to the adhesive bonding of the flexible fastener sheet to the molded seat cushion surface focused on applying the adhesive directly to the molded seat cushion surface and then placing the flexible fastener sheet onto the applied adhesive, in another example the adhesive is first applied directly to the flexible fastener sheet and then the exposed adhesive on the obverse side of the flexible fastener sheet is brought into contact with the molded seat cushion surface. The adhesive may be sprayed onto the obverse side of the flexible fastener sheet, or provided as a pressure-sensitive adhesive. In the latter example, providing the adhesive may involve removing a release liner to expose the pressure-sensitive adhesive. The adhesive may be provided as a layer of acrylic transfer adhesive tape on the obverse side of the flexible fastener sheet, such as Scapa U-855 manufactured by Scapa Tapes North America LLC, Windsor, CT, USA.

The flexible fastener sheet products described above may be die cut from a continuous sheet, leaving a few connecting points to keep the products and sheet together, and then spooled for later separation of the individual fastener products from the continuous sheet. The back surface of the continuous sheet may have exposed fibers that engage the exposed fastener elements to keep the product spooled until use. If the products are to be shipped as separated products, temporary covers can be applied over the fastening area to prevent pre-engagement with the textile fabric of other products. Such covers could be removed and discarded before the product is adhered to the seat cushion, or left in place to aid in seat assembly by preventing pre-engagement of the fastener elements to allow positioning of the trim cover. Such a removable thin sheet or mask can be removed after cover positioning.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of adapting a molded seat cushion for receiving a seat cover, the method comprising
    providing an adhesive on either or both of a flexible fastener sheet and a selected area of a molded foam cushion surface having a three-dimensional contour, the flexible fastener sheet comprising a resin layer and an array of discrete male touch fastener elements, each fastener element having a stem integrally formed with and extending from an outer surface of the resin layer;
    positioning the flexible fastener sheet to cover the three-dimensional contour of the selected area; and
    allowing the adhesive to set to permanently bond the flexible fastener sheet over the selected area of the molded foam cushion surface, with the male touch fastener elements extending away from the molded foam cushion surface for engagement with a seat cover, such that the bonded flexible fastener sheet follows the three-dimensional contour of the selected area.

2. The method of claim 1, wherein the flexible fastener sheet further comprises a textile sheet secured to an obverse side of the resin layer.

3. The method of claim 2, wherein the resin layer comprises multiple parallel strips of resin, each resin strip carrying respective touch fastener elements, with each pair of adjacent strips separated by a lane of exposed textile sheet.

4. The method of claim 3, wherein the textile sheet is elastic in a direction transverse to the strips of resin.

5. The method of claim 2, wherein the textile sheet comprises a non-woven textile material.

6. The method of claim 5, wherein the non-woven textile material has an overall basis weight of between 50 and 100 grams per square meter.

7. The method of claim 2, wherein the resin layer comprises multiple discrete islands of resin, each resin island carrying respective touch fastener elements, with adjacent islands separated by exposed textile sheet.

8. The method of claim 1, wherein the flexible fastener sheet further comprises a layer of foam permanently attached to a side of the resin layer opposite the touch fastener elements, and wherein the adhesive is provided on either or both of the layer of foam and the selected area of the molded foam cushion surface.

9. The method of claim 1, wherein the resin layer comprises one or more stiffening ribs of resin in addition to the touch fastener elements, the one or more ribs positioned to locally increase a bending stiffness of the flexible fastener sheet.

10. The method of claim 1, wherein a ratio of minimum to maximum lateral orthogonal dimensions of the flexible fastener sheet is between 0.3 and 1.0.

11. The method of claim 1, wherein providing the adhesive comprises applying the adhesive directly to the flexible fastener sheet.

12. The method of claim 1, wherein providing the adhesive comprises exposing a pressure-sensitive adhesive on an obverse side of the flexible fastener sheet.

13. The method of claim 1, wherein positioning the flexible fastener sheet comprises placing a positioning tool against the molded foam cushion surface with the selected area exposed to receive the flexible fastener sheet.

14. The method of claim 13, wherein the positioning tool defines an aperture corresponding to the selected area, and wherein providing the adhesive comprising spraying the adhesive onto the selected area with the positioning tool in place.

15. The method of claim 1, wherein the selected area is an area of an outer surface of a bolster of the seat cushion.

16. The method of claim 1, wherein the selected area comprises portions of each of two bolsters separating a central seating area between the bolsters.

17. The method of claim 1, wherein the three-dimensional contour is defined by radii of curvature that vary across the selected area.

18. A method of covering a foam seat cushion, the method comprising:
    adapting a molded seat cushion for receiving a seat cover, according to claim 1; and
    positioning a seat cover over the adapted molded seat cushion, such that fibers on an underside of the seat cover are engaged by the male touch fastener elements of the flexible fastener sheet.

19. A method of adapting a molded seat cushion for receiving a seat cover, the method comprising
    providing an adhesive on either or both of a flexible fastener sheet and a selected area of a molded foam cushion surface;
    positioning the flexible fastener sheet to cover the selected area; and
    allowing the adhesive to set to permanently bond the flexible fastener sheet over the selected area of the molded foam cushion surface;
    wherein the selected area features a three-dimensional contour that the flexible fastener sheet follows as bonded;
    wherein the flexible fastener sheet further comprises a textile sheet secured to an obverse side of the resin layer; and
    wherein the textile sheet comprises a non-woven textile material.

20. A method of adapting a molded seat cushion for receiving a seat cover, the method comprising
    providing an adhesive on either or both of a flexible fastener sheet and a selected area of a molded foam cushion surface;
    positioning the flexible fastener sheet to cover the selected area; and allowing the adhesive to set to permanently bond the flexible fastener sheet over the selected area of the molded foam cushion surface;

wherein the selected area features a three-dimensional contour that the flexible fastener sheet follows as bonded;

wherein the flexible fastener sheet further comprises a textile sheet secured to an obverse side of the resin layer; and wherein the resin layer comprises multiple discrete islands of resin, each resin island carrying respective touch fastener elements, with adjacent islands separated by exposed textile sheet.

21. A method of adapting a molded seat cushion for receiving a seat cover, the method comprising providing an adhesive on either or both of a flexible fastener sheet and a selected area of a molded foam cushion surface;

positioning the flexible fastener sheet to cover the selected area; and allowing the adhesive to set to permanently bond the flexible fastener sheet over the selected area of the molded foam cushion surface;

wherein the selected area features a three-dimensional contour that the flexible fastener sheet follows as bonded;

wherein the flexible fastener sheet comprises a resin layer and an array of discrete male touch fastener elements, each fastener element having a stem integrally formed with and extending from an outer surface of the resin layer; and wherein the resin layer comprises one or more stiffening ribs of resin in addition to the touch fastener elements, the one or more ribs positioned to locally increase a bending stiffness of the flexible fastener sheet.

22. A method of covering a foam seat cushion, the method comprising:

adapting a molded seat cushion for receiving a seat cover, comprising;

providing an adhesive on either or both of a flexible fastener sheet and a selected area of a molded foam cushion surface having a three-dimensional contour;

positioning the flexible fastener sheet to cover the three-dimensional contour of the selected area; and allowing the adhesive to set to permanently bond the flexible fastener sheet over the selected area of the molded foam cushion surface, such that the bonded flexible fastener sheet follows the three-dimensional contour of the selected area; and positioning a seat cover over the adapted molded seat cushion, such that fibers on an underside of the seat cover are engaged by the male touch fastener elements of the flexible fastener sheet.

* * * * *